Figure 23:
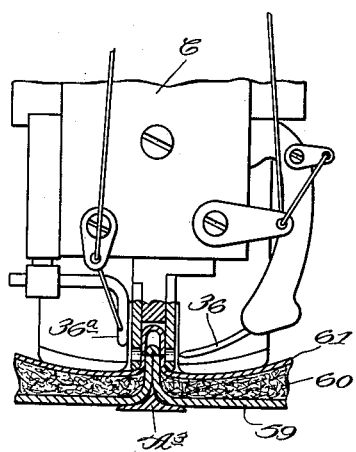

Dec. 12, 1939.  A. S. MITCHELL  2,183,429
APPARATUS FOR MANUFACTURING PLAITED UPHOLSTERY WITH MISMATCHED SEAMS
Filed Feb. 6, 1937  9 Sheets-Sheet 1
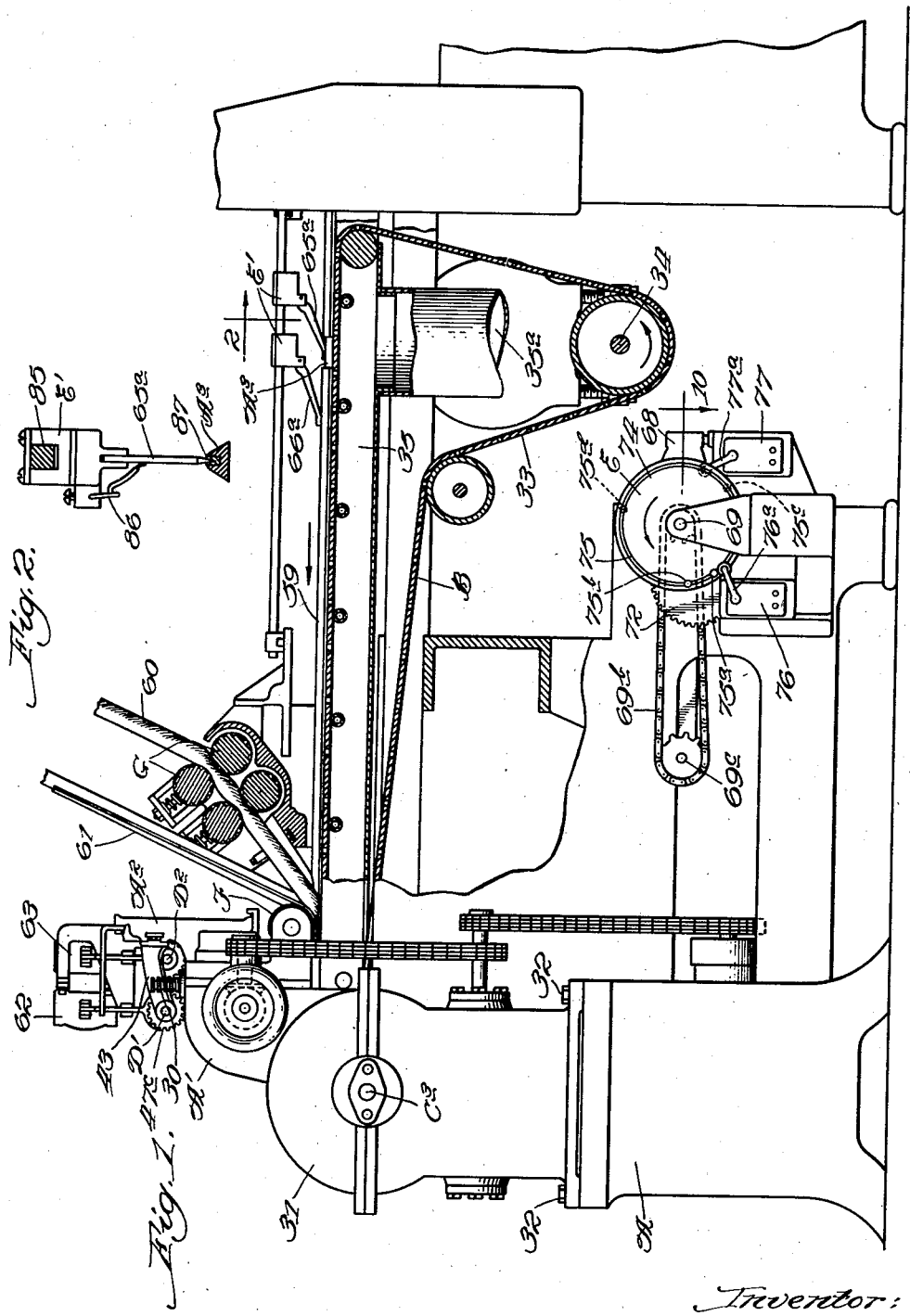

Dec. 12, 1939.  A. S. MITCHELL  2,183,429
APPARATUS FOR MANUFACTURING PLAITED UPHOLSTERY WITH MISMATCHED SEAMS
Filed Feb. 6, 1937  9 Sheets-Sheet 2
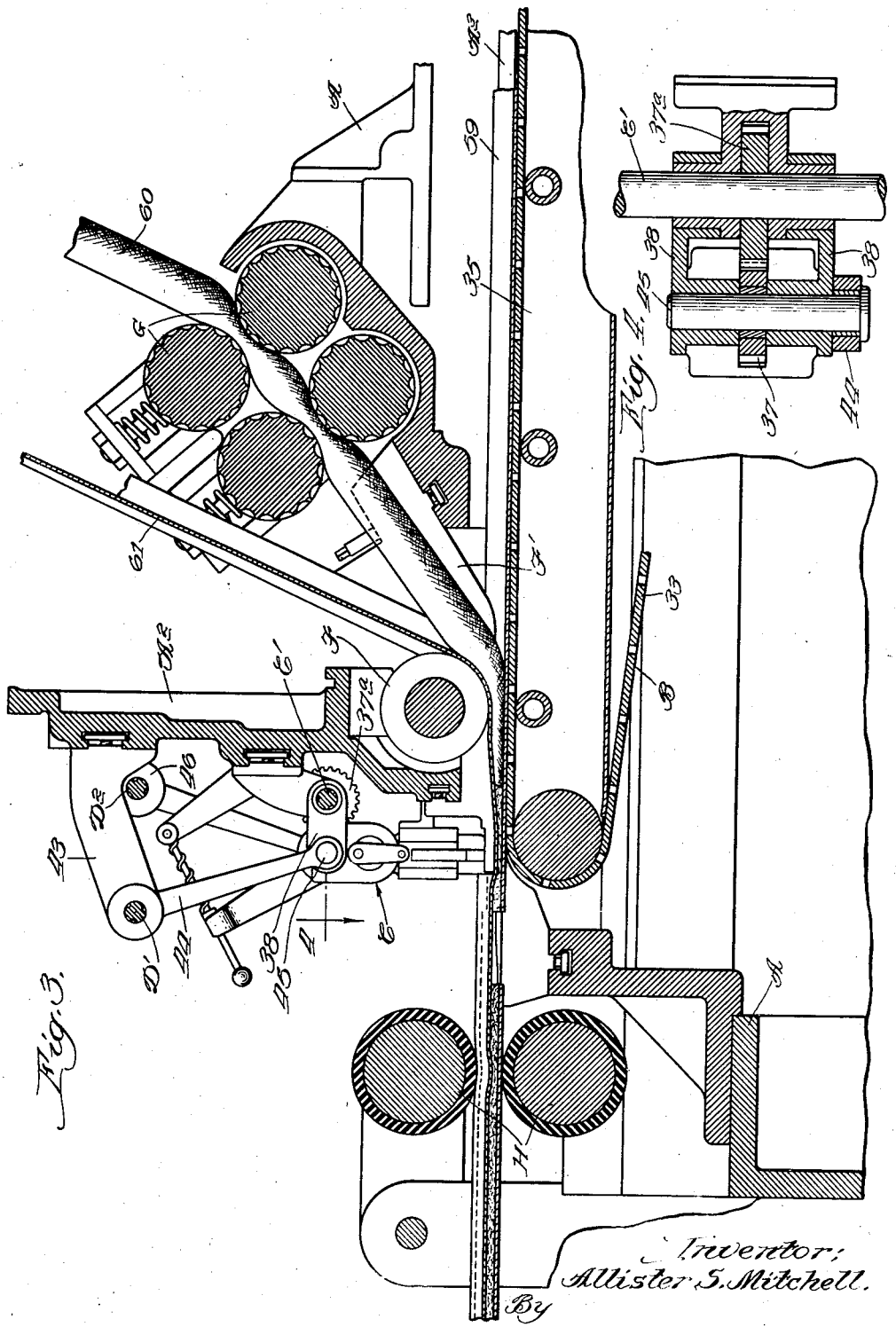

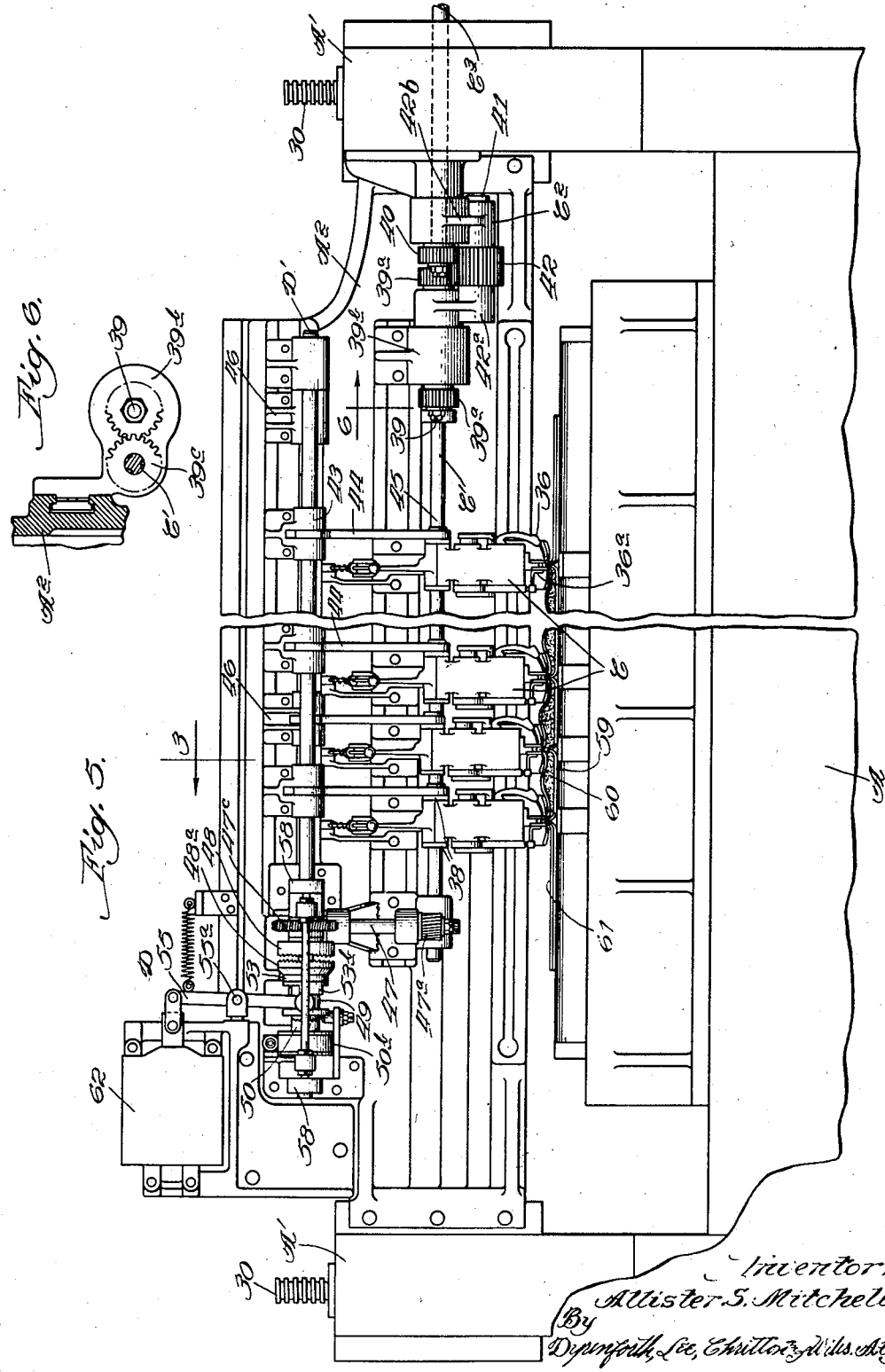

Dec. 12, 1939.　　A. S. MITCHELL　　2,183,429
APPARATUS FOR MANUFACTURING PLAITED UPHOLSTERY WITH MISMATCHED SEAMS
Filed Feb. 6, 1937　　9 Sheets-Sheet 4
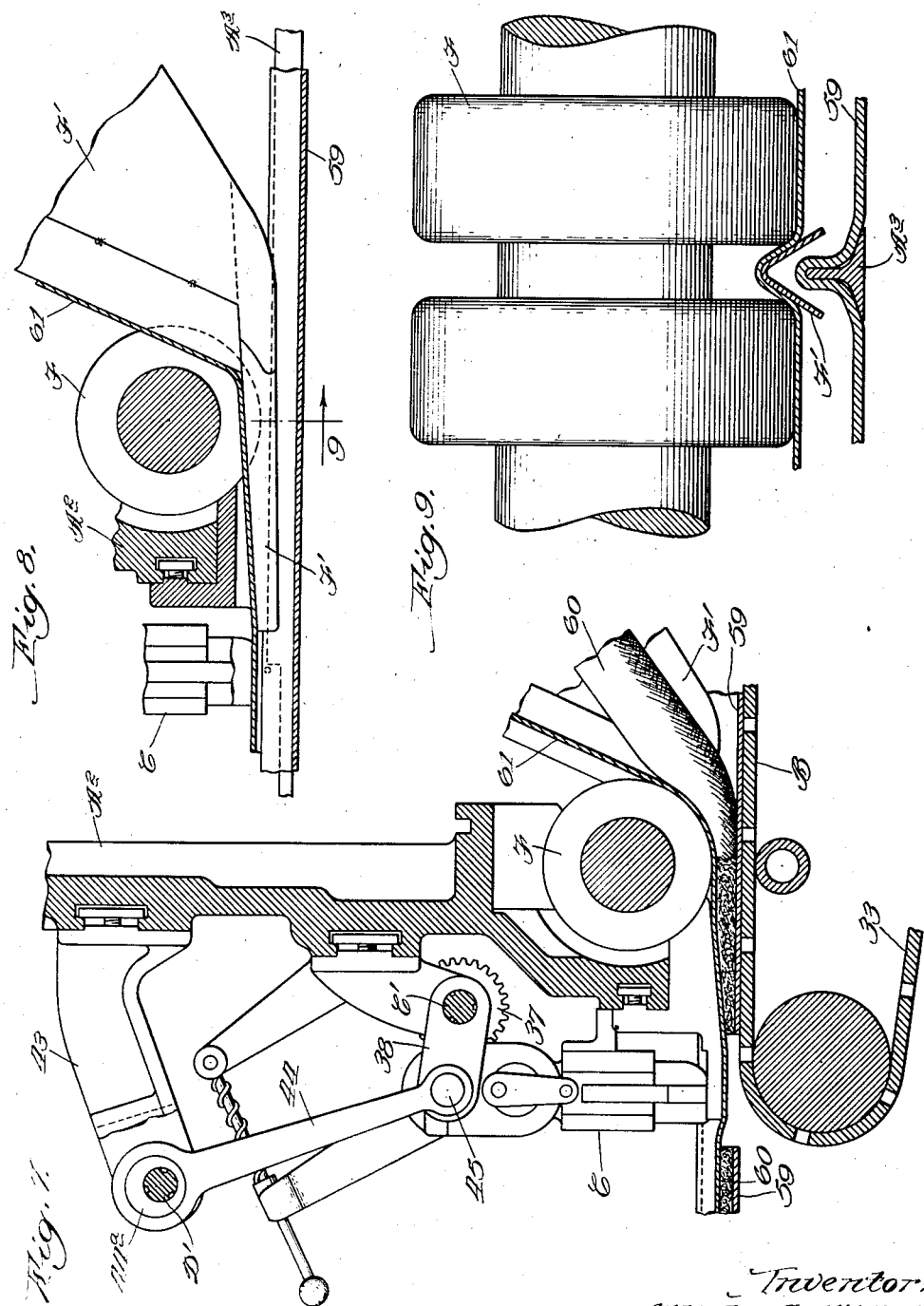
Inventor:
Allister S. Mitchell.
By Dynenforth, Lee, Chritton & Wiles
Attys.

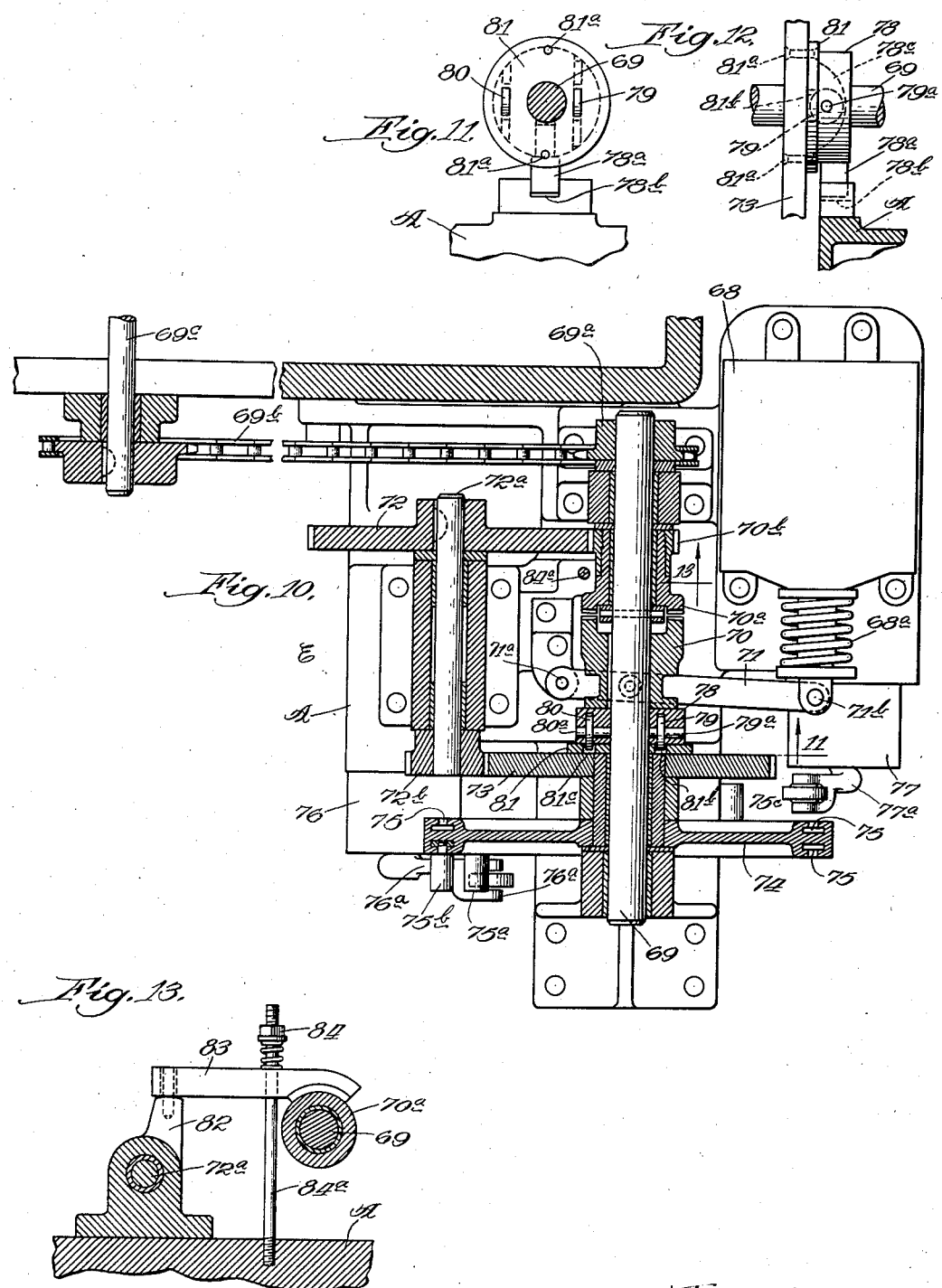

Dec. 12, 1939.  A. S. MITCHELL  2,183,429
APPARATUS FOR MANUFACTURING PLAITED UPHOLSTERY WITH MISMATCHED SEAMS
Filed Feb. 6, 1937  9 Sheets-Sheet 6
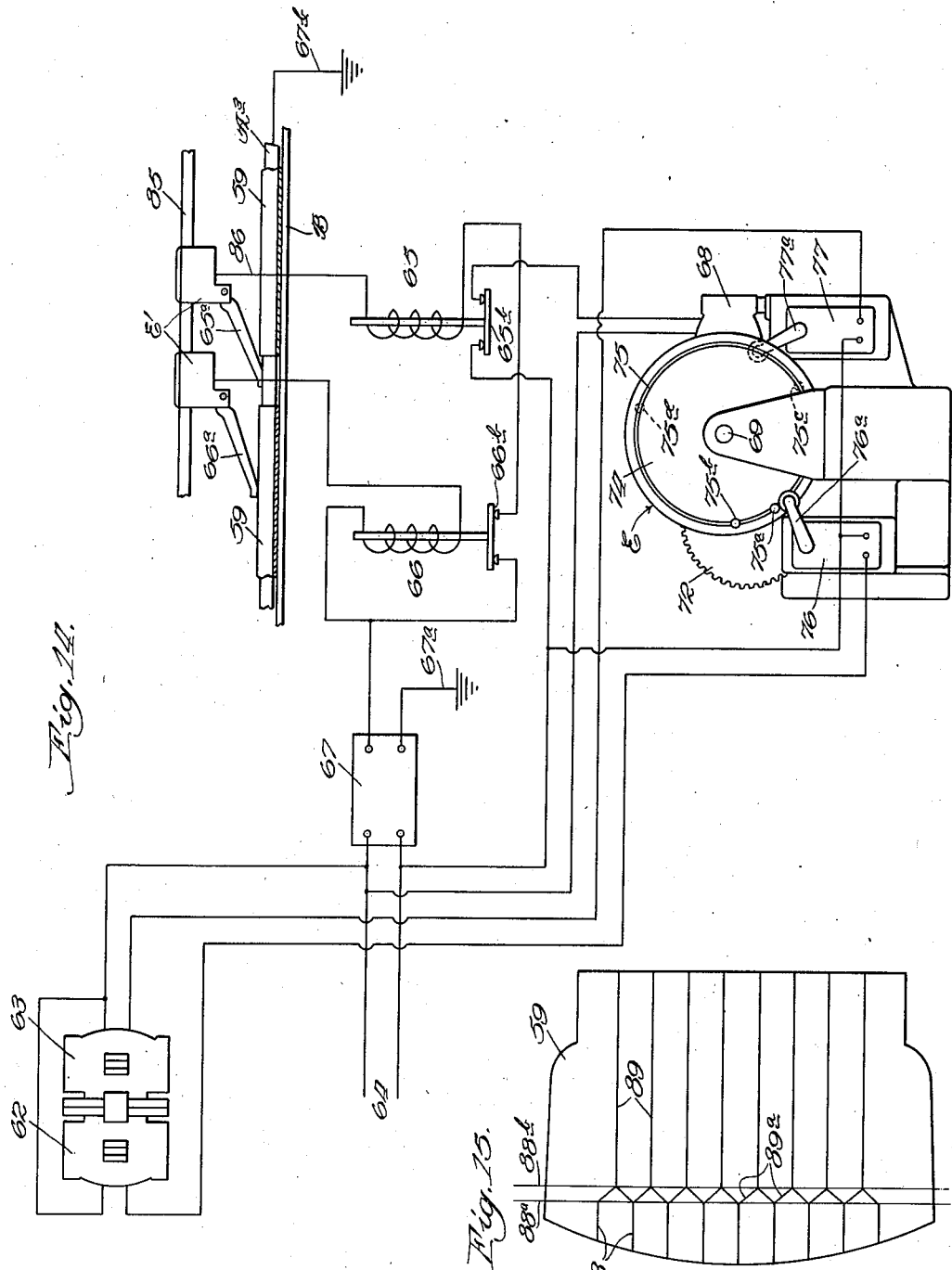

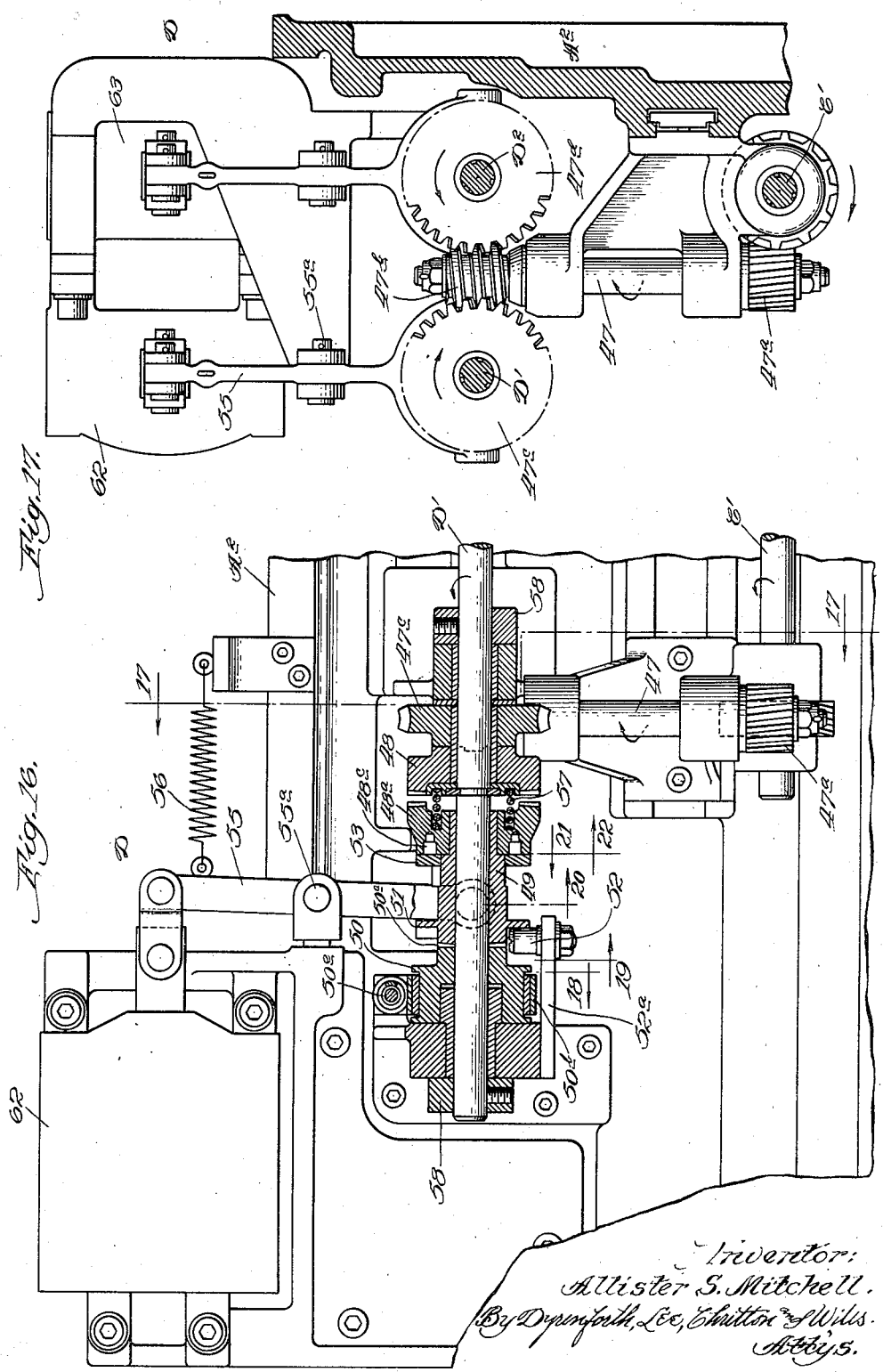

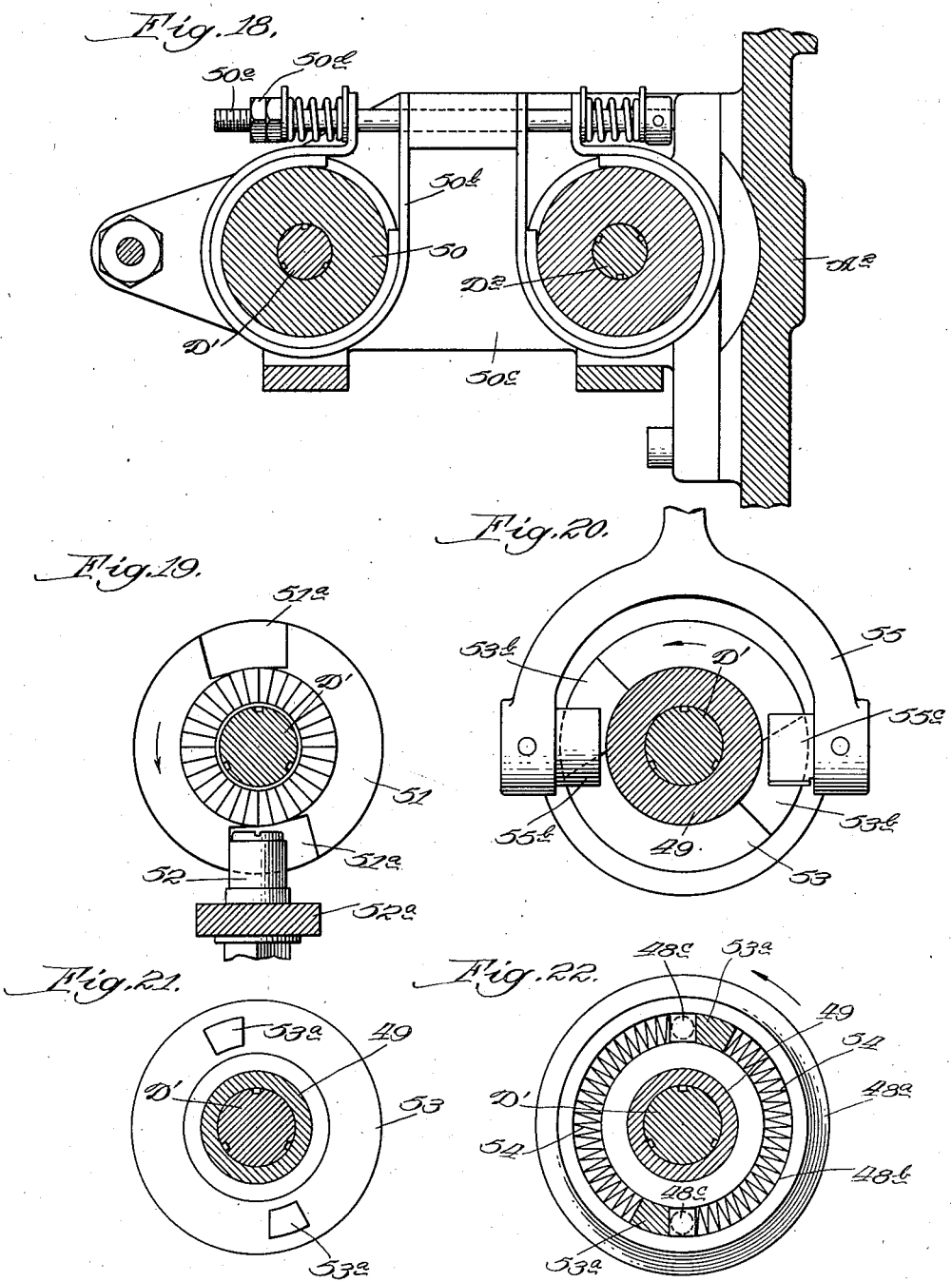
Dec. 12, 1939. A. S. MITCHELL 2,183,429
APPARATUS FOR MANUFACTURING PLAITED UPHOLSTERY WITH MISMATCHED SEAMS
Filed Feb. 6, 1937 9 Sheets-Sheet 8

Patented Dec. 12, 1939

2,183,429

UNITED STATES PATENT OFFICE 2,183,429

APPARATUS FOR MANUFACTURING PLAITED UPHOLSTERY WITH MISMATCHED SEAMS

Allister S. Mitchell, Detroit, Mich., assignor to National Automotive Fibres, Inc., Detroit, Mich., a corporation of Delaware Application February 6, 1937, Serial No. 124,483

26 Claims. (Cl. 112—2)

This invention relates particularly to apparatus for the manufacture of improved plaited upholstery, such as is used for cushions in automobiles and the like.

The primary object of the invention is to provide improved apparatus and an improved method for sewing precut cover-fabrics to a lining-fabric.

A further object of the invention is to provide an improved upholstery cushion in which the cover-fabric seams are not continuous across the cushion but are mismatched to provide an improved appearance.

Heretofore, sewing machines have been provided having a vertically movable cross-head on which was mounted a transverse series of sewing-mechanisms which were movably vertical as a unit. In the present invention, while all of the sewing-heads are supported on a single cross-head, the sewing-mechanisms are divided into two or more series which may be raised or lowered automatically by a timing-device to vary the pattern.

As has heretofore been the practice, precut cover-fabrics are advanced and gathered into seam-ridges and intervening plait-fullnesses while a lining-fabric is similarly gathered and brought into contact with the cover-fabrics so that the seam-portions are in registration. However, in the present invention, the seam-portions are not brought into fully nested relation but sufficient space is provided between the crest of the seam-ridges of the lining-fabric and the crest of the seam-ridges of the cover-fabric so that by raising and lowering the sewing-mechanism, the line of transverse stitches may merely sew the ridge-seams in the lining-fabric, or sew the ridge-seams of both fabrics together. Thus it will be understood that the sewing-mechanisms sew the ridge-seams in the lining-fabric continuously while the ridge-seams in the cover-fabric are only sewed when the sewing-mechanisms are in their lower sewing position. By having the sewing-mechanisms operate continuously to sew the seam-ridges of the lining-fabric, there is no danger of missing any stitches.

If desired, the usual mechanism may be provided for feeding preformed batts into the plait-fullnesses before the fabrics are sewed together. Suitable timing-mechanism is provided to raise and lower each series of sewing-mechanisms to produce the desired pattern in the cover-fabric and after the cushions leave the machine, the ends of the mismatched plaits may be closed by a cross line of stitching in a hand operated sewing machine.

Figure 24:
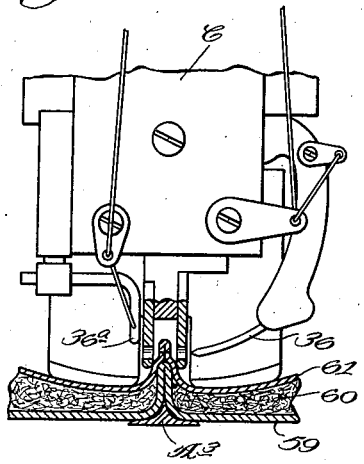
Figure 27:
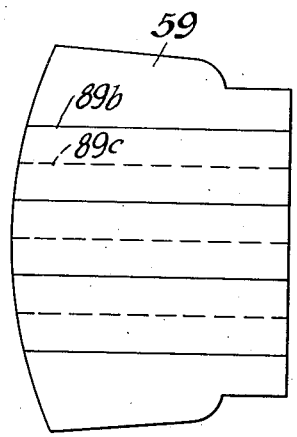
Figure 28:
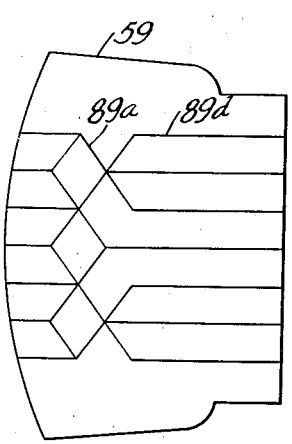
Figure 29:
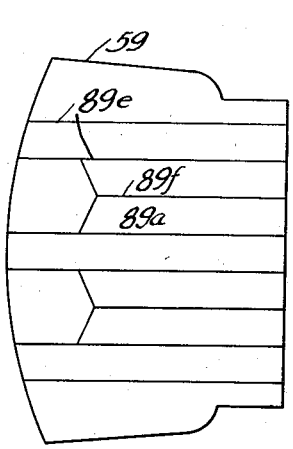
Figure 25:
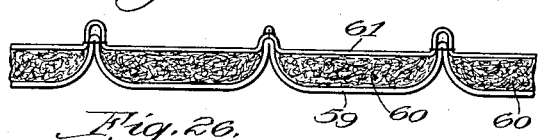
Figure 26:
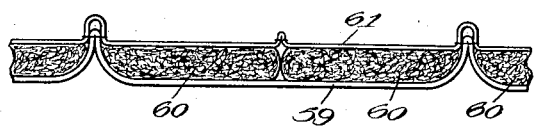

The invention is illustrated in the preferred embodiment in the accompanying drawings, in which:

Figure 1 is a broken side elevational view, partly in section, showing the batt feeding-mechanism, pneumatic conveyor for advancing the precut fabrics, and the timing-mechanism for controlling the vertical movement of the sewing-heads; Fig. 2 is a transverse sectional view of one of the contact fingers, taken as indicated at line 2 of Fig. 1; Fig. 3, an enlarged broken longitudinal sectional view showing the sewing-heads and feeding-mechanisms, taken as indicated at line 3 of Fig. 5; Fig. 4, a broken sectional view, taken as indicated at line 4 of Fig. 3; Fig. 5, a broken front elevational view of the sewing-heads and supporting mechanism; Fig. 6, a fragmentary sectional view, taken as indicated at line 6 of Fig. 5; Fig. 7, an enlarged broken sectional view somewhat similar to Fig. 3 but showing the one series of the sewing-mechanisms in raised position; Fig. 8, an enlarged broken sectional view showing one of the forming shoes for holding the ridge-seams of the lining-fabric above the ridge-seams of the cover-fabric; Fig. 9, a broken sectional view, taken as indicated at line 9 of Fig. 8; Fig. 10, a broken sectional view of the solenoid operated timing-mechanism, taken as indicated at line 10 of Fig. 1; Fig. 11, a fragmentary sectional view, taken as indicated at line 11 of Fig. 10; Fig. 12, a fragmentary sectional view of the locking-mechanism for holding the clutch in engagement during one complete revolution; Fig. 13, a fragmentary sectional view of the clutch brake, taken as indicated at line 13 of Fig. 10; Fig. 14, a diagrammatic wiring plan of the electrical control for the machine whereby the raising and lowering of the sewing-mechanisms is controlled by the forward movement of the cover-fabrics; Fig. 15, a plan view of a completed cushion, made as a result of the setting of the timing-mechanism shown in Fig. 14; Fig. 16, a fragmentary sectional view of one of the solenoid operated clutches for operating one of the eccentric shafts which raises and lowers one series of the sewing-heads; Fig. 17, an end elevational view, partly in section, taken as indicated at line 17 of Fig. 16; Fig. 18, a sectional view, taken as indicated at line 18 of Fig. 16; Fig. 19, an enlarged fragmentary view of one of the locking devices for the half turn mechanism of the clutch, taken as indicated at line 19 of Fig. 16; Fig. 20, a fragmentary sectional view of the clutch yoke, taken as indicated at line 20 of Fig. 16; Fig. 21, a sectional view, taken as indicated at line 21 of Fig. 16; Fig. 22, a sectional view, taken as indicated at line 22 of Fig. 16; Fig. 23, a fragmentary view, partly in section, showing the sewing-mechanism in its lowermost position for sewing through both the lining-fabric and cover-fabric ridge-seams; Fig. 24, a view similar to Fig. 23 but showing the sewing-mechanism in its upper position for merely sewing the lining-fabric ridge-seam; Fig. 25, a sectional view of a cushion as it leaves the sewing-mechanism showing how the stitching at the center seam did not engage the registering ridge-seam of the cover-fabric; Fig. 26 shows the same cushion illustrated in Fig. 25 after the cushion has been stretched out and showing how the plait is provided with a pair of cotton batts; Fig. 27 is a plan view of a cushion having incomplete alternate seams; Fig. 28 is a plan view of a cushion having another design of incomplete seams; and Fig. 29 is a plan view of another cushion having a different design provided by proper adjustment of the timing-mechanism.

In the embodiment illustrated, A designates a main frame provided with vertical standards A', cross-head A², and a bed provided with longitudinal ridge-bars A³ over which precut cover-fabrics are gathered into seam-ridges and intervening plait-fullnesses; B, a pneumatic conveyor for advancing the cover-fabrics to sewing position; C, sewing-heads mounted on the cross-head A² and driven by a power shaft C' which is driven through a coupler C² from a motor shaft C³ on the main frame; D, mechanism for raising and lowering each series of sewing-heads by solenoid operated clutches adapted to impart half turns to eccentric shafts D' and D²; E, timing-mechanism adapted to energize the solenoids in the mechanism D under the control of contact-fingers E' which are operated by the cover-fabrics; F, a forming roll adapted to cooperate with guide shoe F' and bring the seam-ridges of the lining-fabric and cover-fabric into partially nested position; G, batt-feeding rolls for advancing cotton batts into the plait-fullnesses before reaching the sewing-mechanism C; and H, delivery rolls for drawing the cushion beyond sewing position.

The main frame A may be of any suitable construction and is provided with a cross-head A² which may be raised and lowered with respect to the standards A' by means of jack screws 30. A motor 31 is secured to the main frame, by means of bolts 32, and drives the power shaft C³. The bed of the machine is provided with fixed longitudinal ridge-bars A³ over which the precut cover-fabrics are advanced and gathered into seam-ridges and intervening plait-fullnesses, by means of the suction-conveyor B.

The conveyor B is provided with a foraminous belt 33 which is driven by the shaft 34 over a suction box 35 provided with an exhaust pipe 35ª, as is well understood in the art.

The sewing-heads C are of well-known construction having a transverse sewing-needle 36 and a looper-needle 36ª to sew the ridge-seams by means of a transverse line of stitching, as shown in Figs. 23 and 24. Each of the sewing-heads is provided with an operating gear 37 which is held in mesh with an operating gear 37ª, by means of pitmans 38, as shown in Fig. 4. As shown in Figs. 5 and 6, a short jack shaft 39 provided at both ends with gears 39ª, is journalled in a bracket 39ᵇ carried by the cross-head so as to form a continuation of the shaft C' and provide a reverse rotation through gear 39ᶜ on the shaft C'. In order to provide a positive movable driving connection between the gears 39ª and the gear 40 provided on the shaft C³, the coupler C² is provided. The coupler has a jack shaft 41 provided with a gear 42 which is held in driving engagement with the gear 39ª by means of the pitman 42ª, and is held in driving engagement with the gear 40 by means of the pitman 42ᵇ.

The mechanism D serves to raise and lower each series of sewing-heads and is controlled by the timing-mechanism E. As shown in Figs. 3 and 7, the eccentric shaft D' is journalled in brackets 43 which are adjustably mounted on the cross-head A². Connecting rods 44 are journalled, at their upper ends, on eccentrics 44ª provided between the arms of the brackets 43 on the shaft D', and their lower ends are pivotally connected to the pitmans 38, by means of the pivot shaft 45. Thus it will be understood that when the shaft D' is rotated a half a turn, the sewing-mechanisms supported thereon will be raised or lowered depending upon the position of the eccentrics. In the preferred form, the eccentrics 44ª are all splined to the shaft D' in the same angular relation and another series of sewing-mechanisms are supported on the eccentric shaft D², as shown in Fig. 3. Although the journalled brackets 46 are shorter, the connecting rods and general operation are the same as that described above.

As shown in Figs. 16–22, each of the eccentric shafts D' and D² has separate clutch mechanisms and although both clutches operate independently, their mechanism is the same and it will only be necessary to describe one in detail. Power is obtained from the shaft C' by means of a vertical jack shaft 47 provided at its lower end with a driving gear 47ª and at its upper end with a worm gear 47ᵇ adapted to drive the worm gears 47ᶜ and 47ᵈ in opposite directions. The latter worm gears are journalled on the shafts D' and D², respectively.

Referring now to the clutch mechanism provided for the shaft D', the driving half 48 of the clutch is journalled on the shaft D' and is fixed to the worm gear 47ᶜ so as to rotate constantly therewith. The driven portion of the clutch 48ª is fixed on a sleeve 49 which is splined to the shaft D'. A brake drum 50 is journalled on the shaft D' and is provided with clutch teeth to engage cooperating teeth 50ª at the left end of the sleeve 49, as viewed in Fig. 16, to slow down the rotation of the driven parts when the clutch is disengaged. The device is provided with a suitable brake band 50ᵇ which is adjustably secured to the bracket 50ᶜ by means of nuts 50ᵈ on a threaded stud 50ᵉ, as shown in Fig. 18.

The sleeve 49 is provided with a flange 51 provided with a pair of notches 51ª which are adapted to be engaged by a roller 52 journalled on a fixed bracket 52ª. Thus it will be seen that when the driven half of the clutch 48ª is thrown into engagement with the driving head 48, it cannot be released from driving engagement until the half turn is completed to permit the roller 52 to engage the other notch 51ª. The roller also assures the stopping of the shaft D' in its proper angular position.

Because of the rapid rotation of the shaft, it is not practical to have the solenoid become energized and de-energized during the time that the shaft D' makes a half turn, and accordingly, additional means are desirable to permit the sleeve and driven half of the clutch 48ª to move back to its disengaged position. For this reason, a collar 53 is journalled on the sleeve 49 and has two lugs 53ª on the rear or left face, and two lugs 53ᵇ on its front face (see Figs. 20-22). The driven half of the clutch 48ª is provided with a circular groove 48ᵇ adjacent to the collar 53, and into which the lugs 53ª on the collar extend. A pair of fixed studs 48ᶜ project from the head 48ª into the groove 48ᵇ and normally the lugs 53ª are held against said studs by compression-springs 54.

The sleeve 49 is actuated by clutch throw-out yoke 55 which is pivotally mounted on the cross-head A², as indicated at 55ª. As shown in Fig. 20, the yoke is provided with an inwardly extending rounded finger 55ᵇ and a diametrically opposed inwardly extending block 55ᶜ which is substantially square in cross-section. The finger 55ᵇ and the block 55ᶜ normally engage and bear against the lugs 53ᵇ of the collar 53, as shown in Fig. 20. However, when the clutch is thrown into engagement and the collar 53 rotates, the finger 55ᵇ and block 55ᶜ slip off of the lugs so that the sleeve 49 is free to move to the left when the next notch 51ª reaches the roller 52.

The collar 53 is held from further rotation when the block 55ᶜ engages the edge of one of the lugs 53ᵇ on the collar 53. However, as the clutch is still engaged, the driven head 48ª will continue to be turned against the compression-springs 54. After the roller 52 drops into one of the notches 51ª, the clutch becomes disengaged, the solenoid has been de-energized, and the springs 54 will push the lugs 53ª back into engagement with the pins 48ᶜ, returning the parts to a new starting position. Thus it will be seen that the driven half of the clutch and the shaft D' are turned through 180° but the collar 53 is stopped after about 150° of movement and turns the remaining 30° after the solenoid is de-energized. As shown in Fig. 16, a tension-spring 56 tends to throw the clutch out of engagement when the solenoid circuit is broken. Also, a compression-spring 57 is disposed between the clutch heads to urge the driven head 48ª into engagement with the teeth on the brake drum 50 to stop the sleeve from turning. As shown in Fig. 16, the shaft D' is provided with adjustable collars 58, at the ends of the clutch bearings, to keep the shaft D' in proper position.

From the above description, it will be understood that each time the solenoid is energized the clutch will be thrown into engagement and cannot be disengaged until it has rotated the shaft D' 180° to cause the associated series of sewing-heads to move from one vertical sewing position to another. Also, as explained above, a separate clutch and solenoid operate the shaft D² to raise and lower the other series of sewing-heads.

The timing-mechanism E is controlled by the precut cover-fabrics 59 which are advanced over the ridge-bars A³ to the forming roll F where they meet the cotton batts 60 and the lining-fabric 61. As will be understood by reference to the wiring diagram in Fig. 14, a front solenoid 62 controls the operation of the shaft D' while a rear solenoid 63 controls the operation of the shaft D². Power for operating the solenoids is obtained from a suitable source 64 and relays 65 and 66 are energized from a transformer 67 having one side grounded, as indicated at 67ª. The timing-device is thrown into operation by means of a solenoid 68, best shown in Figs. 10 and 14. The ridge-bar shown in Figs. 2 and 14 is grounded, as indicated at 67ᵇ, and the rear contact-finger 65ª is connected in series with the coil of the relay 65 so that the circuit may be broken by the advancing cover-fabric. In like manner the contact-finger 66ª is connected in series with the coil of the relay 66.

The timing-device E has a shaft 69 provided with a sprocket wheel 69ª which is constantly driven through a sprocket chain 69ᵇ from a shaft 69ᶜ which, in turn, is driven from the motor 31 by connections not shown. The shaft is provided with a driving clutch head 70 which is splined to the shaft 69 and adapted to be shifted into contact with the driven head of the clutch 70ª by means of an operating yoke arm 71 having one end pivotally mounted on the frame, as indicated at 71ª, and the other end connected to the solenoid by means of a pivot 71ᵇ. The driven head 70ª is journalled on the shaft 69 and provided with a gear 70ᵇ which is in mesh with a larger gear 72 which is fixed to a gear shaft 72ª provided at its other end with a smaller gear 72ᵇ which is in mesh with a gear 73 journalled on the shaft 69. A timing-wheel 74 is journalled on the shaft 69 and connected with the gear 73 so as to rotate therewith. The timing-wheel is provided on opposite faces of its rim portion with T-slots 75 to receive on one side studs 75ª and 75ᵇ and on the opposite side studs 75ᶜ and 75ᵈ. This construction makes the studs circumferentially adjustable with respect to the wheel 74. Adjacent to one face of the wheel is a switch 76 which controls the solenoid 62 and has an arm 76ª disposed in the path of the studs 75ª and 75ᵇ so that when the wheel rotates counterclockwise, as viewed in Fig. 14, the solenoid will be energized, momentarily, when each of the studs depresses the arm 76ª. In like manner, a switch 77 controls the solenoid 63 and has an arm 77ª adjacent to the opposite face of the wheel 74 so as to be actuated by the studs 75ᶜ and 75ᵈ.

When the solenoid 68 is energized, it throws the driving clutch head 70 into engagement with the driven head 70ª, against the force of a compression-spring 68ª. In order that the clutch will remain in engagement for one complete revolution of the wheel 74, a shiftable locking-device is provided, best shown in Figs. 10-12. The locking device comprises a roller housing 78 which is freely journalled on the shaft 69 but has a depending finger 78ª to engage a guideway 78ᵇ in the frame to prevent rotation of the housing. The housing has a pair of milled-out slots 78ᶜ to receive rollers 79 and 80 which are journalled on pins 79ª and 80ª, respectively, so that the rollers extend outwardly beyond the face of the housing member. A bearing plate 81 is fixedly connected to the gear 73 by means of rivets 81ª and is provided with a slot 81ᵇ to normally register with the roller 79, and a slot 81ᶜ to register normally roller 80. It may be noted that the roller 79 and the corresponding slot 81ᵇ are nearer to the center of the shaft 69 than the roller 80 and the corresponding slot 81ᶜ. This arrangement is to require plate 81 and timing-wheel 74 to make a full revolution before the rollers will find the registering slots. In operation, when the clutch head 70 is thrown into engagement with the driven head 70ª by the solenoid 68, the gear 73 is positively driven, and as the housing 78 is shiftably locked against rotation, the plate 81 will force the housing against the rear face of the head 70 by turning the slots 81ᵇ and 81ᶜ out of register with the rollers 79 and 80. When the solenoid is de-energized, the spring 68ª will be enabled to throw the clutch out of engagement when the rollers have travelled completely around the face of the plate 81 and have come into register with their corresponding slots. When the members do come into register, the clutch will immediately be disengaged through the action of spring 68a, and the wheel is positioned against further rotation until the solenoid is again energized.

As shown in Fig 13, the journal box 82 for shaft 72a provides a support for one end of a brake arm 83 which is yieldingly urged into engagement with the driven half of the clutch 70a, by means of a nut 84 provided on a stud 84a in the main frame. This brake is to slow down the rotation of the driven parts when the clutch is disengaged.

From the wiring diagram, shown in Fig. 14, it will be understood that the relay 65 is connected in series with contact-finger 65a and through the relay contact 66b of the relay 66. The relay 66 is connected in series with the contact-finger 66a. The contact-fingers 65b of the relay 65 are adapted to complete the circuit to energize the solenoid 68 and start the timing-mechanism for a complete revolution of the wheel 74. Thus it will be understood that only the timing-device is controlled by the contact-fingers E', while the solenoids 62 and 63 are controlled through the action of the studs on the timing-wheel against the arms of the switches 76 and 77.

When no fabrics are between the ridge-bar A³ and contact-fingers E', the relay 66 will be energized, opening the contact-fingers 66b and de-energizing the relay 65 so that no current can pass through the contact-fingers 65b to energize the solenoid 68. When the cover-fabric 59 is advanced by the pneumatic conveyor B to open the circuit through contact-finger 65a, the relay 65 will remain de-energized and this will continue when contact-finger 66a is opened to de-energize relay 66 and close contacts 66b. However, as the fabric continues to advance to the position shown in Fig. 14, the contact-finger 65a will engage the ridge-bar A³ and be able to energize the relay 65 because the relay 66 is de-energized. This will provide power to the solenoid 68 through the contact-fingers 65b and the timing-wheel will make one complete revolution. By reference to the wiring diagram, it will be understood that the only time the solenoid 68 is energized is when the contact 66a is open and the contact 65a is closed. Any other arrangement will not start the timing-device.

As best shown in Figs. 2 and 14, the contacts E' are supported for longitudinal adjustment on a bar 85 and the contact-finger is pivotally connected to the supporting bracket and electrically connected with a wire 86. Preferably the contacting longitudinal ridge-bar A³ is provided with a brass insert 87 having a longitudinal V-shaped slot. This arrangement makes a good contact between the ridge-bar and finger even though the only pressure is that of gravity.

The timing-wheel 74 is shown in Fig. 14 at the beginning of its revolution. The stud 75a will momentarily close the switch 76 and energize the solenoid 62 to cause a half revolution of the shaft D'. This will cause the sewing-heads supported thereon to be lowered and sew the seam portions 88 on the cushion shown in Fig. 15. When the stud 75b again closes the switch 76 to energize the solenoid 62, the shaft D' will be given another half turn to raise the sewing-heads, and the seams in the cover-fabric will stop along the line indicated as 88a in Fig. 15. Preferably the cushion-fabric is then permitted to advance to the line 88b before the stud 75c closes switch 77 to energize solenoid 63 and lower the series of sewing-heads supported on the shaft D². When this happens, the seam portions 89 will be stitched in the cover-fabric and this will continue until the stud 75d again closes the switch 77 to raise the sewing-mechanisms supported on the shaft D². In order to finish the cushion, a tranverse zigzag line of stitching 89a may be made on a manually operated sewing machine. This line of stitching can join the ends of the seams 88 and 89 in the cover-fabric and provide a very attractive appearance. Thus it will be understood that by properly positioning the contacts E' on the bar 85, the timing-mechanism is controlled by the movement of fabrics and that suitable sewing patterns may be provided, such as indicated in Figs. 15 and 27-29, by regulating the studs on the wheel 74.

As best shown in Figs. 7-9, inclusive, the forming roll F is journalled at the lower portion of the cross-head A². This roll serves to bring the lining-fabric and cover-fabric seam portions into partially nested position and to compress the interleaved batts 60. In the present invention it is necessary to provide space between the crest of the seam-ridge of the cover-fabric and the crest of the seam-ridge of the lining-fabric, and this is done by means of guide shoes F', sometimes referred to as sheds, which are fixed to the bed of the machine in rear of the forming roll F. Each guide shoe has an inverted V-shaped nose which extends forwardly beneath the forming roll to a position just in rear of the sewing-heads. The shed holds the lining-fabric in superposed position, as best shown in Fig. 9, and enables the sewing-mechanisms to sew the seam-ridges of one or both fabrics depending on whether they are in their raised or lowered positions.

The batts are advanced to the forming roll by means of the feed rolls G, as is well understood in the art. If desired, suitable mechanism, not shown, may be provided to break the batts at the end of each cover-fabric and commence their readvancement at the front edge of the next cover-fabric.

The forming rolls H, shown in Fig. 3 are disposed in front of the sewing-heads and are power driven by suitable gearing, not shown. Preferably these wheels are driven slightly faster than the conveyor B so that the completed cushions will be drawn taut in front of the sewing-heads.

In Figs. 27, 28 and 29 are illustrated various designs of sewing which may be performed on my improved machine. In Fig. 27 the cushion 59 is formed with a plurality of continuous seams 89b, and between the full lines of sewing are broken lines of sewing indicated at 89c. In Fig. 28 the cushion 59 is decorated by a plurality of broken lines 89d which are interconnected as shown by diagonal lines 89a, the latter of which may be formed by hand machines. In Fig. 29 the cushion 59 has a plurality of continuous lines of sewing 89e and incomplete lines of sewing 89f, the incomplete lines of sewing being joined to the complete lines of sewing as indicated by diagonal lines 89a, the latter preferably being formed on hand machines.

As will be understood by reference to Figs. 15, 25 and 26, each of the plaits between the seam-ridges 88 and between the seam-ridges 89, contain two cotton batts 60. However, due to the mismatching of the seams, the batts are rearranged in different adjacent pairs in the two sets of plaits. In other words, although the plaits are mismatched, the cotton batts, like the seam-ridges in the lining-fabric, continue straight across the completed cushion.

The foregoing detailed description has been given for clearness of understanding only, and no unnecessary limitations should be understood therefrom, but the appended claims should be construed as broadly as permissible, in view of the prior art.

I claim:

1. Apparatus of the character set forth, comprising: a transverse series of sewing-mechanisms; means for operating said sewing-mechanisms continuously; mechanism for feeding a lining-fabric and precut cover-fabrics to and past said sewing-mechanisms; and means responsive to the travel of said cover-fabrics for raising and lowering said sewing-mechanisms to regulate the sewing of seams in said cover-fabrics.

2. A device as specified in claim 1, in which the means responsive to the travel of said cover fabrics comprises a clutch, and a solenoid for operating said clutch, an electric circuit for said solenoid, said circuit including yielding electrical contacts disposed in the path of the advancing cover-fabrics.

3. A device as specified in claim 1, in which the means responsive to the travel of said cover fabrics comprises a clutch, and a solenoid for operating said clutch, an electrical circuit for said solenoid, said circuit having yielding electrical contacts disposed in the path of the advancing cover-fabrics, and said contacts being adjustable longitudinally of the path of said cover-fabrics.

4. A device as specified in claim 1, in which the means responsive to the travel of said cover fabrics comprises a clutch, and a solenoid for operating said clutch, an electric circuit for said solenoid, said circuit having yielding electrical contacts disposed in the path of the advancing cover-fabrics, a program timing device for said raising and lowering means, said clutch serving to initiate operation of said device.

5. Apparatus of the character set forth, comprising: a bed provided with a series of longitudinal ridge-bars, one of said bars being provided at its crest with a V-shaped slot; a bracket slidably mounted for adjustment on a supporting bar disposed above said slotted ridge-bar; a contact finger pivotally mounted in said bracket so as normally to make electrical connection within the slot in the ridge-bar; upwardly movable sewing mechanisms disposed in front of said ridge-bars; a solenoid connected in series with said contact finger for controlling the movement of said sewing-mechanisms; and pneumatic conveyor-means for advancing precut cover-fabrics, over said ridge-bars and beneath the contact finger to the sewing-mechanisms so that the movement of the sewing-mechanisms will be coordinated to the movement of the fabrics.

6. Apparatus for the purpose set forth, comprising: two series of sewing-mechanisms, means to continuously operate said sewing mechanisms each series of sewing-mechanisms being supported on an independent eccentric shaft; a solenoid-controlled clutch for rotating each of said shafts to raise and lower each series of sewing-mechanisms out of and back to effective position; a rotary timing device for energizing the solenoid-controlled clutches; and a clutch mechanism for driving said timing device; and means for actuating said clutch mechanism.

7. A device as specified in claim 6, in which the clutch mechanism is provided with locking means for holding the clutch mechanism engaged for a complete revolution each time it is operated.

8. A device as specified in claim 6, in which the rotary timing device comprises a wheel provided with circumferentially adjustable studs adapted to engage the arms of switch-members which control the solenoid-controlled clutches.

9. A device as specified in claim 6, in which the rotary timing device comprises a wheel provided on each side with a pair of circumferentially adjustable studs, each pair of studs being adapted to control the movement of one of the eccentric shafts.

10. Apparatus for the purpose set forth, comprising: a main frame having a vertically adjustable cross-head; a power shaft journalled in brackets on said cross-head and provided with driving gears; a plurality of sewing-heads having operating gears held in mesh with said power shaft driving gears by means of pitmans; and link-mechanism for raising and lowering said sewing-heads with respect to said cross-head while the heads are being operated.

11. A device as specified in claim 10, in which the link-mechanism comprises connecting-rods having their lower ends pivotally connected to one end of the pitmans and their upper ends journalled on an eccentric shaft which is journalled in brackets on the cross-head.

12. A device as specified in claim 10, in which the main frame is equipped with a power-shaft having at one end a driving gear, the cross-head power-shaft is also provided with a driving gear, and an idler gear is mounted on a jack shaft and held in mesh with both of said gears by means of two pitmans which link said jack shaft to said driving shafts and enable the cross-head to be moved while shafts are held in driving engagement.

13. Apparatus for the purpose set forth, comprising: a main frame having a bed over which may be fed precut cover-fabrics provided with seam-ridges and intervening plait-fullnesses; means over said bed for forming a lining-fabric into seam-ridges and intervening plait-fullnesses; a forming roll journalled in said frame over the bed and adapted to guide the seam-ridges of the lining and cover-fabrics into nested engagement; sewing-mechanisms disposed in front of said forming roll; and guide shoes supported on said frame and extending forwardly beyond said forming roll so as to hold the crest of the lining-fabric seam-ridges above the crest of the cover-fabric seam-ridges so that the sewing-mechanisms can sew the seam-ridges of the lining-fabric alone or the seam-ridges of the lining-fabric and cover-fabrics together.

14. Mechanism for sewing spaced cover fabrics to a continuous lining fabric comprising sewing mechanism, a conveyor for feeding said fabrics past said sewing mechanism, means for continuously operating said conveyor and said sewing mechanism, means for shifting said sewing mechanism from a position in which it stitches said cover fabric to said lining fabric to a position in which it sews a seam in said lining fabric, and means responsive to the travel of said cover fabrics for actuating said shifting means.

15. Mechanism for sewing spaced cover fabrics to a continuous lining fabric comprising sewing mechanism, a conveyor for feeding said fabrics past said sewing mechanism, means for continuously operating said conveyor and said sewing mechanism, means for shifting said sewing mechanism from a position in which it stitches said cover fabric to said lining fabric to a position in which it sews a seam in said lining fabric, and means responsive to the travel of said cover fabrics for actuating said shifting means, said last named means comprising a member mounted adjacent said conveyor in position to be engaged by said advancing cover fabrics.

16. Mechanism for sewing a series of spaced unit fabrics comprising sewing mechanism, a conveyor for feeding said fabrics past said sewing mechanism, driving means for continuously operating said sewing mechanism and said conveyor, means for shifting said sewing mechanism from a position in which it stitches said unit fabrics to a position in which it does not stitch said unit fabrics, a program timing means for actuating said shifting means, and means responsive to the travel of said cover fabrics for initiating operation of said timing means.

17. Mechanism for sewing a series of spaced unit fabrics comprising sewing mechanism, a conveyor for feeding said fabrics past said sewing mechanism, driving means for continuously operating said sewing mechanism and said conveyor, means for shifting said sewing mechanism from a position in which it stitches said unit fabrics to a position in which it does not stitch said unit fabrics, a program timing means for actuating said shifting means, means responsive to the travel of said cover fabrics for initiating operation of said timing means, said shifting means comprising an eccentric, and a solenoid-controlled clutch for rotating said eccentric.

18. Mechanism for sewing a series of spaced unit fabrics comprising sewing mechanism, a conveyor for feeding said fabrics past said sewing mechanism, driving means for continuously operating said sewing mechanism and said conveyor, means for shifting said sewing mechanism from a position in which it stitches said unit fabrics to a position in which it does not stitch said unit fabrics, a program timing means for actuating said shifting means, means responsive to the travel of said cover fabrics for initiating operation of said timing means, said shifting means comprising an eccentric, a controlled clutch for rotating said eccentric, and means effective upon energization of said clutch to cause substantially a half revolution of said eccentric.

19. Mechanism for sewing a series of spaced unit fabrics comprising sewing mechanism, a conveyor for feeding said fabrics past said sewing mechanism, driving means for continuously operating said sewing mechanism and said conveyor, means for shifting said sewing mechanism from a position in which it stitches said unit fabrics to a position in which it does not stitch said unit fabrics, a program timing means for actuating said shifting means, and means responsive to the travel of said cover fabrics for initiating operation of said timing means, said timing means comprising a wheel, members on said wheel for actuating said shifting means, a clutch, the driving half of said clutch driven from said driving means, the driven half connected to said wheel, said clutch constructed to remain engaged for substantially a complete revolution.

20. Mechanism for sewing a series of spaced unit fabrics comprising sewing mechanism, a conveyor for feeding said fabrics past said sewing mechanism, driving means for continuously operating said sewing mechanism and said conveyor, means for shifting said sewing mechanism from a position in which it stitches said unit fabrics to a position in which it does not stitch said unit fabrics, a program timing means for actuating said shifting means, and means responsive to the travel of said cover fabrics for initiating operation of said timing means, said timing means comprising a wheel, means responsive to the approach of a unit fabric to said sewing mechanism for initiating rotation of said wheel, and means on said wheel for actuating said shifting means.

21. Sewing mechanism comprising a plurality of independently shiftable needles, power means for reciprocating said needles, independent means for shifting said needles into and out of operative engagement with a portion of a fabric to be sewed, and timing means for controlling said shifting means, said power means being effective to continue reciprocation of said needles in either shifted position.

22. Sewing mechanism comprising a plurality of independently shiftable needles, power means for reciprocating said needles continuously in either shifted position, independent means for shifting said needles into and out of operative engagement with a portion of a fabric to be sewed, and timing means for controlling said shifting means comprising a rotatable member, separately adjustable elements on said member, and actuating means for said shifting means controlled by said elements.

23. In a sewing machine, a frame, a power shaft rotatably supported on said frame, a sewing-head, a needle carried by said sewing head, means for raising and lowering said sewing-head, a driving gear on said power shaft, a needle operating gear in said sewing-head meshing with said driving gear, and a link connecting said sewing-head to said frame for rotation about the axis of said power shaft, whereby said sewing-head may be raised or lowered out of and into sewing position while said gears remain in mesh, a conveyor for feeding spaced fabrics past said machine, and means responsive to the travel of said fabrics for raising and lowering said sewing-head in timed relation to the traverse of a fabric therepast.

24. In a sewing machine, a frame, a power shaft rotatably supported on said frame, a sewing-head, a needle carried by said sewing head, means for raising and lowering said sewing-head, a driving gear on said power shaft, a needle operating gear in said sewing-head meshing with said driving gear, and a link connecting said sewing-head to said frame for rotation about the axis of said power shaft, whereby said sewing-head may be raised or lowered out of and into sewing position while said gears remain in mesh, a conveyor for feeding spaced fabrics past said machine, and means responsive to the travel of said fabrics, lowering said head as a fabric approaches said sewing-head, and thereafter raising and lowering said head in a predetermined manner as said fabric passes said sewing-head.

25. In a device of the character described, a conveyor for feeding spaced unit fabrics, sewing mechanism comprising independently operable sewing means, independent control means for controlling the operation of said sewing means to render them operative or inoperative to sew said fabrics, independent actuating means for said control means, a program timer for said actuating means operable to render one or more sewing means inoperative on predetermined portions of said fabrics, and means responsive to the approach of a fabric to the sewing means to initiate operation of said timing means.

26. Apparatus of the character described comprising a conveyor, sewing mechanism adjacent said conveyor and movable to and from sewing position relative to said conveyor, eccentric means including a driven rotatable shaft for moving said sewing mechanism, driving means for said sewing mechanism including a constantly rotating driving shaft, means responsive to advance on said conveyor of an article to be sewed to interconnect said shafts, means effective to prevent disconnection of said shafts for a predetermined rotation thereof, and other means effective after said predetermined rotation to disconnect said shafts and to arrest rotation of said driven shaft.

ALLISTER S. MITCHELL.